United States Patent Office 3,321,552
Patented May 23, 1967

3,321,552
UNSATURATED POLYESTERS PREPARED FROM ALKYL ALPHA-METHYLENE-BETA-HYDROXY-PROPIONATE
Samuel C. Temin, Pittsburgh, and Melvin E. Baum, Monroeville, Pa., assignors to Koppers Company, Inc., a corporation of Delaware
No Drawing. Filed May 31, 1962, Ser. No. 198,752
8 Claims. (Cl. 260—860)

This invention relates to novel condensation polyesters having pendant unsaturated bonds. In one specific aspect, it relates to alpha-methylene-beta-hydroxypropionic acid polyesters and the method for preparing same. In another specific aspect, it relates to novel copolymers and insoluble resins prepared from alpha-methylene-beta-hydroxypropionic acid polyesters by reactions through the pendant unsaturated bonds.

A new monomer, ethyl-alpha-methylene-beta-hydroxypropionate, has now become available, prepared according to the co-pending application of R. W. Rosenthal et al., Ser. No. 175,994, filed Feb. 27, 1962, now U.S. Patent 3,066,165. This monomer contains functional groups which permit the formation of both condensation and addition polymers. In our co-pending application, Ser. No. 198,716, now Patent No. 3,288,883, filed even date herewith, there are disclosed and claimed the novel addition polymers. The present application is directed to the condensation polymers, poly(alpha-methylene-beta-propionate), the preparation of which is illustrated by the following equation:

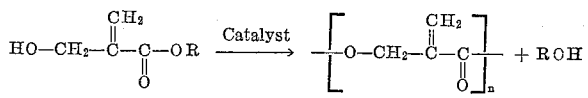

Numerous polyesters have been prepared and many of these have achieved commercial importance. By variation in the structure and size of the portions of the molecule between the ester linkages, a great range of physical properties can be achieved. Polyesters may be viscous fluids, brittle glasses, or hard crystalline solids. Linear, soluble polyesters are commonly prepared by the reaction of a dicarboxylic acid and a glycol or by the self-condensation of a hydroxycarboxylic acid. The latter procedure is applicable in the practice of this invention. Of particular interest are the omega-hydroxyalkylcarboxylic acids, i.e., carboxylic acids substituted on the terminal carbon with a hydroxyl group. By variation in length and shape of the alkylene group, the properties of the polymer may be varied to produce useful articles of commerce such as polyester resins. In order to prepare polyesters capable of further reaction through double bonds, it has been heretofore necessary to employ unsaturated acids or glycols. Commonly, to prepare polymers containing the desirable features of a polyester while still possessing sites of unsaturation, acids such as maleic or fumaric were used. These polyesters having the structure:

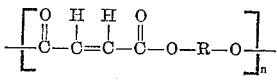

are capable of further polymerization, copolymerization, or reaction with other chemicals.

Unlike the polyesters of the present invention, however, the saturated polyesters do not possess reactive vinyl groups permitting further reaction or polymerization. The unsaturated polyesters known heretofore are distinguished from the polyesters of this invention by not possessing methylene groups. The sites of pendant unsaturation of the novel polyesters are considerably more reactive than those of the internal unsaturation of maleic or fumaric polyesters.

It is an object of our invention to prepare novel polyesters having pendant unsaturated bonds. It is another object of our invention to crosslink our novel unsaturated polyesters with difunctional monomers. It is a further object of our invention to react the novel unsaturated polyester with other monomers to produce graft polymers.

In accordance with our invention, we have discovered novel polyesters having pendant unsaturated bonds of the formula:

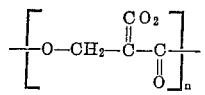

and a new method of making such polyesters. The method comprises polymerizing in an oxygen-free atmosphere a beta-hydroxypropionate of the formula:

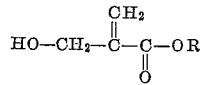

wherein R is lower alkyl, in the presence of a vinyl polymerization inhibitor and in the presence of a transesterification catalyst, at a temperature of 75–200° C. and a pressure of 0.1 to 760 mm. mercury.

Polymerization is performed either in the absence or presence of a solvent. Preparation of the polyester by bulk polymerization involves heating in an inert atmosphere alkyl alpha-methylene-beta-hydroxypropionate containing a vinyl polymerization inhibitor in the presence of a transesterification catalyst at a temperature of 75°–200° C. and under a pressure ranging from atmospheric to sub-atmospheric until a solid polymer having a melting point above 150° C. is formed.

The propionate monomer is of the formula:

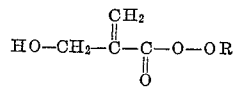

wherein R is lower alkyl. At the present time, these are the only unsaturated monomers containing condensable hydroxyl and carboxyl groups available for reaction. The preferred monomer is ethyl alpha-methylene-beta-hydroxypropionate.

To prevent vinyl polymerization of the unsaturated propionate, it is necessary that an inhibitor be added. Usually it is advantageous to add the inhibitor immediately to the monomer if some time should elapse between preparation of the monomer and its use. Useful inhibitors, added in a range of from 0.01 to 1.0 percent based on the weight of the monomer, are hydroquinone, anthraquinone, 2,5-di-t-butylhydroquinone, monomethyl ether of hydroquinone, diamino-anthraquinone, di-t-butyl-p-cresol, copper, alkylated bisphenol, chloranil, methylene blue, p-hydroxydiphenylamine and N,N'-d i p h e n y l phenylenediamine.

The reaction also requires a transesterification catalyst, which is used in an amount from about 0.01–1.0 percent based on the weight of the monomer. Useful catalysts are the acetates of cadmium, zinc, lead, copper, barium, manganese and sodium; the oxides of zinc, lead, arsenic, antimony and boron; organic titanate esters, e.g., tetra-n-butyltitanate; p-toluene sulfonic acid; and phosphoric acid.

In order to prevent oxidation of the monomers and the unsaturated polymer during the reaction, an inert atmosphere is provided. Suitable inert gases are nitrogen, helium, argon, methane, and the like. It is convenient to pass this inert gas through the reaction mixture thus facilitating the removal of alcohol. The gas also serves as a viscosity indicator, permitting the experienced observer to determine the progress of the reaction from the shape and speed of the gas bubbles in the mixture.

The polymerization is conducted at a temperature at which a reasonable rate of reaction is attained, and above the boiling point of the alcohol produced by the polycondensation reaction. For the lower alkyl esters of alpha-methylene-beta-hydroxypropionic acid, the reaction temperature should exceed about 65°, and preferably be in the range of 75–200° C. The upper limit is such that decomposition and side reactions of the monomer and resultant polyester is limited to a minimum. During the later stages of the reaction, it is desirable to maintain the reaction mixture in a fluid state by heating to a temperature of about 150 to 200° C. Normal atmospheric pressure is maintained during the initial phase of the polycondensation. As the reaction proceeds and the solution becomes more viscous, the pressure is gradually reduced to facilitate the removal of the alcohol by-product; but, the pressure should be adjusted so as not to exceed the boiling point of the monomer at the particular temperature of reaction. For ethyl alpha-methylene-beta-hydroxy propionate, the boiling point at several pressures was determined as; 102–103° C. at 22 mm. and 90–91° C. at 11 mm. As the reaction proceeds substantially to completion, the pressure is adjusted to remove any unreacted monomer from the reaction zone, by using pressures about as low as 0.1 mm.

The time required for the preparation of the novel polyesters depends on the catalyst system used, and the operating temperatures and pressures. Reaction time is a function of the activity of the catalyst in a particular system. Generally, for a given catalyst system, the time required is decreased by operating at higher temperature and lower pressure. Complete polymerization requires about one-half to eight hours.

In one preferred embodiment of the invention, the reaction mixture is heated initially at atmospheric pressure above about 75° C. for one-half to two hours during which time fairly rapid evolution of alcohol occurs. As the reaction proceeds and the mixture becomes viscous, the pressure is decreased to about 50 mm. Hg while the temperature is raised to 100–130° C. for a period of one to three hours. When the mixture becomes very viscous, the pressure is further reduced to 0.1–0.5 mm. Hg and the temperature is raised to about 150° C. for an additional one-half to three hours to insure complete reaction. At this temperature and pressure, unreacted monomer as well as ethanol is removed. The loss of monomer, however, is insignificant because its concentration, at this stage of the reaction, is quite small.

The polymer may also be prepared in the presence of a solvent. This involves the same inhibitors and catalysts as discussed above. Also, similar conditions of temperature, pressure and time apply to solution polymerization as to bulk polymerization. However, a high boiling solvent vehicle, such that the desirable reaction temperatures of up to about 150° C. may be reached without significant solvent loss, must be used. Useful solvents are o-dichlorobenzene, decalin, and diethyleneglycol diethylether, as well as other similar high boiling inert solvents.

Poly(alpha-methylene-beta-propionate) is isolated by conventional techniques. In bulk polymerization, the molten polymer may be poured directly into the mold to cool and solidify. The polymer may then be macerated into suitable shapes, such as beads, rods, etc. A highly solvent resistant form of the polymer is obtained by extracting low molecular weight factions from the initial polymer with organic solvents. Thus, for example, chloroform can be used to extract soluble, low molecular weight polymers. The residual chloroform insoluble polymer, at ordinary temperatures is resistant to all common solvents, e.g., halogenated hydrocarbons, ether, alcohol, hydrocarbons, dimethylformamide, dimethylsulfoxide, cresols, phenols, formic acid, etc. Also, it is insoluble in hot diethyl carbonate and in acetonitrile. However, it is readily dissolved by heating suspensions of the polymer in dimethylformamide, butyrolacetone, nitromethane, diemthylsulfoxide, ethylene glycol monobutylether and acetic acid.

The repeating unit of the homopolymer, alpha-methylene-beta-oxy-propionyl

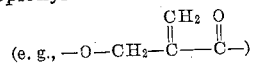

(e. g., —O—CH₂—C—C—)

is incorporated in copolyesters to modify the properties of other polyesters by providing reactive sites of pendant unsaturation. When the aforementioned unit is present in minor amounts from about 0.1–10% of the total number of repeating units, the beneficial effects of the pendant alpha-methylene groups are obtained. The copolyesters may be prepared by the reaction of alkyl alpha-methylene-beta-hydroxypropionate with other polyester forming monomers or mixtures of monomers, such as lactones having up to six carbon atoms in the annular ring, e.g., propiolactone, butyrolactone, caprolactone; aliphatic hydroxy acids having up to ten carbon atoms (or esters thereof), e.g., glycolic acid, lactic acid, hydroxypivalic acid; hydroxy acids having up to twelve carbon atoms, e.g., hydroxybenzoic acid, hydroxynaphthoic acid, hydroxy-diphenyl carboxylic acid; a mixture of glycols of the formula:

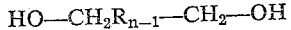

wherein R is a member selected from the group consisting of alkylene of up to 8 carbon atoms, cycloalkylene of 4–6 carbon atoms, phenylene, and naphthylene and $n$ is an integer having a value of 1–2, e.g., ethylene glycol, propylene glycol, hexamethylene glycol, neopentyl glycol, butenediol, hexafluoropentanediol, 1,4-bis-hydroxymethylcyclohexane, isopropylidene-diphenol, 1,3-bis-hydroxymethylbenzene; and dibasic acids (or esters thereof) of the formula:

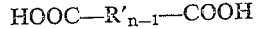

wherein R' is a member selected from the group consisting of alkylene of up to 8 carbon atoms, cycloalkylene of 4–6 carbon atoms, and phenylene, and $n$ is an integer having a value of 1–2, e.g., oxalic, glutaric, adipic, sebacic, maleic, fumaric, terephthalic, phthalic, isophthalic, perfluoroglutaric acid, in the presence of an esterification catalyst and a vinyl polymerization inhibitor and in accordance with the procedures set forth above for the preparation of homopolyesters.

The pendant unsaturation of the polyesters provides sites for numerous chemical reactions. These reactions include the formation of graft polymers, cross-linkages, and the conventional reactions of double bonds.

Graft polymers are prepared by reacting vinyl monomers with the polyester in the presence of a free radical initiator at a temperature of about 50–150° C. Useful free radical catalysts are: benzoyl peroxide, cyclohexanone peroxide, lauroyl peroxide, t-butyl hydroperoxide, i-propylperoxy carbonate, potassium persulfate, hydroxyheptyl peroxide, t-butylperacetate, di-t-butyl peroxide, and azobisisobutyronitrile. Useful monomers that can be grafted to the polyester are: ethyl acrylate, methyl methacrylate, beta-hydroxyethyl methacrylate, styrene, 2,4-dichlorostyrene, tetrafluoroethylene, vinyl carbazole, methyl vinyl ketone, isopropenyl methyl ketone, diethyl fumarate, acrylonitrile, maleic anhydride, vinyl chloride, vinylidene chloride, vinylidene cyanide, vinyl acetate, N-vinylpyrolidone, butadiene and acenaphthalene.

Cross-linking of the polyesters to render the polymer infusible, occurs by reacting the polyester with a difunctional monomer in the presence of a catalyst. Useful difunctional monomers are: glycols, diamines, dimercaptans, polyvinyl alcohol, polyether glycols, polyester glycols. Useful catalysts include free radical catalysts, discussed above in relation to graft polymers, and basic catalysts, such as butyl lithium, sodium hydride, sodium alkoxide, sodium naphthalene, sodium amide, phenylmagnesium bromide, triphenyl phosphine, and tertiary amines.

The novel polyesters may be further modified at the site of pendant unsaturation by the characteristic reactions of double bonds. These include addition of monofunctional addends, e.g., the addition of halogens; oxidation, e.g., the addition of ozone; and hydrogenation, e.g., saturating the double bonds with hydrogen.

Our invention is further illustrated by the following examples:

Example I

In a test tube fitted with a nitrogen capillary tube, a vacuum line, and a receiver cooled to −70° C., was placed a mixture of 3.2 grams of ethyl alpha-methylene-beta-hydroxypropionate, 15 mg. of hydroquinone and .02 ml. of tetra-butyl titanate under a nitrogen atmosphere. The mixture was heated from 85–150° C. in 50 minutes and then maintained at 150° C. for an additional four hours while the pressure was gradually reduced from atmospheric to 0.1 mm. Hg. A liquid, 0.5 gram, recovered in the receiver was identified as mainly ethanol by its infrared spectrum.

The solid reaction product remaining in the test tube was cooled to room temperature and slurried with 30 ml. of chloroform. The chloroform-soluble material was separated from the insolubles by filtration and then added to 50 ml. of n-hexane. After removing the solvents, a colorless polymer was obtained weighing 0.14 gram.

The dried chloroform-insolubles, 1.7 grams, were equivalent to 82% yield based on the monomer. At room temperature, this polymer was found to be soluble only in sulfuric acid. Identification of the chloroform-insoluble polymer by infrared spectrum showed absorption at 5.86, 7.56 and 8.80 microns, indicating the presence of alpha-beta-unsaturated polyesters. This infrared spectrum is in comparison to ethyl alpha-methylene-beta-hydroxypropionate polymerized through the vinyl groups which shows absorption at 5.82, 8.10 and 8.6 microns. In addition, the presence of olefin unsaturation in the polyester is further shown by medium intensity absorption at 6.10 and 10.2 microns, which, in the saturated addition polymer showed either very weak bands or were absent entirely.

Example II

Following the procedure of Example I, 13.0 grams of ethyl alpha-methylene-beta-hydroxypropionate, 0.1 gram di-t-butyl-p-cresol and 0.06 ml. of tetra-n-butyl titanate were heated under a nitrogen atmosphere for five hours at 75–150° C. The polymer, 2.1 grams, soluble in a mixture of chloroform and n-hexane, had a melting point of about 60° C. and a specific viscosity of 0.02. The chloroform-soluble, n-hexane insoluble material, 2.2 grams, had a melting point of about 100° C. and a specific viscosity of 0.03. The chloroform-insoluble polymer, 2.7 grams, had a melting point of about 150° C. These three fractions gave a total yield of isolated polymer of 83%.

Example III

A 50 ml. flask fitted with at thermometer, nitrogen capillary, vacuum outlet and a distillation column connected to a condenser and receiver was charged under a nitrogen atmosphere with 26 grams (0.2 mole) of ethyl alpha-methylene-beta-hydroxypropionate, 0.1 gram of di-t-butyl-p-cresol and 0.2 ml. of tetra-n-butyl titanate. The mixture was heated at 150–185° C. for one hour, during which 7.2 ml. of ethanol was collected in the receiver (62% of theoretical). The cooled mixture was stirred with 100 ml. of chloroform. The chloroform-soluble, low molecular weight polymers were discarded and the chloroform-insoluble polymer, 6 grams (30%) was identified as polycondensed ethyl alpha-methylene-beta-hydroxypropionate. The product had a hydroxyl number of 241, indicating the molecular weight to be about 230.

Example IV

Using a procedure similar to Example III and using the same amounts of reactants, the mixture was heated for one hour at 170° C. and 0.5 mm. Hg pressure. The chloroform-insoluble product, 10.1 grams of polyester (60%) had a hydroxyl number of 45, indicating a molecular weight of about 1245.

Example V

Using a procedure similar to Example III, 39.0 grams of ethyl alpha-methylene-beta-hydroxypropionate, 0.1 gram of zinc acetate, 0.1 gram of N-phenyl-2-naphthylamine were heated under a nitrogen atmosphere at a temperature of 160–200° C. for four hours. The mixture was then heated under reduced pressure of 50–0.5 mm. Hg at 200° C. for one hour. The chloroform-insoluble polyester, 15 grams (59%), had a hydroxyl number of 62, indicating that the molecular weight was about 905.

Example VI

Following the procedure of Example VII, 0.5 gram of methyl methacrylate, 0.05 gram of poly(alpha-methylene-beta-propionate) and 5 mg. of benzoyl peroxide were heated at a temperature of 70° C. in a sealed glass tube with constant shaking. Gelation occurred after about one-half hour, and the tube was removed from the bath. The contents of the tube were then poured into a beaker containing 50 ml. of acetone, and the acetone-insolubles were removed by filtration. The acetone-solubles were treated with 100 ml. of methanol, whereby a precipitate of 0.25 gram of polymethyl methacrylate was obtained. The acetone-insoluble graft polymer weighed 0.4 gram. The infrared spectrum showing a decreased absorption at 6.2 microns indicating that grafting had occurred through the pendant unsaturation of the polyester.

Example VII

A heavy-walled glass tube was charged with 4.9 grams styrene, 0.5 gram of poly(alpha-methylene-beta-propionate) and 5.9 mg. of benzoyl peroxide. After several freeze and thaw cycles in vacuo to remove dissolved oxygen, the tube was sealed and placed in a shaking bath at 70° C. After about forty minutes, the mixture gelled suddenly. Extraction of the solid on a shaker overnight with 100 ml. of benzene gave 5 grams of insoluble, infusible, cross-linked product.

Example VIII

A test tube containing 0.5 gram of poly(alpha-methylene-beta-propionate) was placed in an oil bath at a temperature of 185° C. After about one-half hour the melt became increasingly viscous and thereafter solidified. The product obtained was insoluble in dimethylformamide and had a melting point above 350° C.

Example IX

In a test tube was added 0.5 gram of poly(alpha-methylene-beta-propionate) and 5 mg. of t-butyl hydroperoxide. The contents of the tube was melted in an oil bath and resolidified in several minutes. The product obtained was an insoluble, infusible, cross-linked polymer.

Example X

To a solution of 0.5 gram poly(alpha-methylene-beta-propionate) in 10 ml. of dimethylformamide at a temperature of 100° C. was added 0.05 gram of ethylenediamine. Almost immediate precipitation of an infusible polymer was obtained. Under the same conditions a polyester containing internal unsaturation was unreactive.

Example XI

A 100 ml., three-necked round bottom flask fitted with a thermometer, nitrogen capillary, stirrer and a short column attached to a condenser and receiver, was charged with 39 grams of ethylene adipate, 5 grams of ethyl alpha-methylene-beta-hydroxypropionate, 50 mg. of di-t-butyl-p-cresol and 0.1 gram of tetra-n-butyl titanate. The mixture was heated at 140–215° C. for two hours at atmospheric pressure. Then the pressure was reduced to 0.3 mm. Hg and the heating continued at 205–180° C. for five and one-half hours. The product obtained, 42 grams of polymer, was cooled to give a crystalline, waxy solid. Identification of the product using infrared spectroscopy showed absorption at 6.1 and 12.1 microns, indicating the presence of vinyl and alpha-methylene propionate groups. This shows that a co-polyester of ethylene adipate and ethyl alpha-methylene-beta-hydroxypropionate has been formed.

*Example XII*

To 7 grams of the co-polyester produced in Example XI was added 3.0 grams of styrene, 0.1 gram of cyclohexanone peroxide and 0.2 ml. of cobalt naphthenate solution. The mixture was agitated and then divided into two portions. One portion was cured on a steam bath for five minutes to produce a brittle solid. The other portion was permitted to stand at room temperature and various changes were recorded. The mixture became viscous after 15 minutes and gelled in about two hours. It was then placed on a steam bath for two hours to give a hard solid polymer. The solid polymer failed to dissolve in benzene indicating that no homopolystryrene was present.

*Example XIII*

To 3.3 grams of the co-polyester prepared by Example XI and gently heated on a steam bath to give a melt, was added 33 mg. of azobisisobutyronitrile. Further heating on the steam bath produced complete gelation in a period of about ten minutes, indicating that cross-linking had occurred. A control experiment with polyethylene adipate and azobisisobutyronitrile gave no gelation after one and one-half hours on the steam bath. This indicates that the ethyl alpha-methylene-beta-hydroxy-propionate component is essential to cross-linking the polyester, since the polyethylene adipate alone showed no signs of cross-linking.

*Example XIV*

To a 100 ml. round bottom flask fitted with a stirrer, thermometer, nitrogen capillary and short column attached to a condenser and receiver, a mixture of 14.8 grams phthalic anhydride, 9.8 grams maleic anhydride, 15.2 grams propylene glycol, 2.6 grams ethyl alpha-methylene-beta-hydroxypropionate and 0.4 gram of hydroquinone were agitated under a nitrogen atmosphere at 180–200° C. for six hours. The pressure was then reduced to 1 mm. Hg and heating at a temperature of 200° C. was continued for one hour to remove the excess propylene glycol. Seven grams of the residue was cross-linked by mixing with 3 grams of styrene, 0.16 gram of lauroyl peroxide and heating at 77° C. Gelation occurred in about two minutes, indicating that cross-linking had occurred.

We claim:

1. A method of making poly(alpha-methylene-beta-propionate) having a melting point above 150° C. comprising condensation polymerizing in an inert atmosphere lower alkyl alpha-methylene-beta-hydroxypropionate in the presence of a vinyl polymerization inhibitor and a transesterification catalyst at a temperature of 75–200° C. and a pressure of 0.1–760 mm. Hg.

2. A method of making poly(alpha-methylene-beta-propionate) having a melting point above 150° C. by a condensation reaction comprising heating in a nitrogen atmosphere ethyl alpha-methylene-beta-hydroxypropionate in the presence of hydroquinone and tetra-butyl titanate at a temperature of 85–150° C. and a pressure of 0.1–760 mm. mercury.

3. An unsaturated polyester melting above 150° C. having the repeating units of

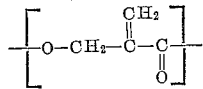

4. Method of making copolyesters containing pendant unsaturated bonds comprising condensing in an inert atmosphere a lower alkyl alpha-methylene-beta-hydroxypropionate with polyester forming monomers selected from the group consisting of lactones, having up to six carbon atoms in the annular ring; aliphatic hydroxy acids having up to ten carbon atoms; aromatic hydroxy acids having up to twelve carbon atoms; and mixtures of glycols of the formula:

$$HO-CH_2-R_{n-1}-CH_2-OH$$

wherein R is a member selected from the group consisting of alkylene of up to 8 carbon atoms, cycloalkylene of 4–6 carbon atoms, phenylene, and naphthylene and $n$ is an integer having a value of 1–2, and dibasic acids of the formula:

$$HOOC-R'_{n-1}-COOH$$

wherein R' is a member selected from the group consisting of alkylene of up to 8 carbon atoms, cycloalkylene of 4–6 carbon atoms, and phenylene, and $n$ is an integer having a value of 1–2, in the presence of a transesterification catalyst and a vinyl polymerization inhibitor at a temperature of 75–200° C.

5. Method of making copolyesters containing pendant unsaturated bonds comprising condensing in an inert atmosphere a lower alkyl alpha-methylene-beta-hydroxypropionate with lactones, having up to six carbon atoms in the annular ring, in the presence of a transesterification catalyst and a vinyl polymerization inhibitor at a temperature of 75–200° C.

6. A copolyester containing pendant unsaturated bonds consisting essentially of 0.1–10 percent of a lower alkyl alpha-methylene-beta-hydroxypropionate condensed with a polyester forming monomer selected from the group consisting of lactones, having up to six carbon atoms in the annular ring; aliphatic hydroxy acids having up to ten carbon atoms; aromatic hydroxy acids having up to twelve carbon atoms; and mixtures of glycols of the formula:

$$HO-CH_2-R_{n-1}-CH_2-OH$$

wherein R is a member selected from the group consisting of alkylene of up to 8 carbon atoms, cycloalkylene of 4–6 carbon atoms, phenylene, and naphthylene and $n$ is an integer having a value of 1–2, and dibasic acids of the formula:

$$HOOC-R'_{n-1}-COOH$$

wherein R' is a member selected from the group consisting of alkylene of up to 8 carbon atoms, cycloalkylene of 4–6 carbon atoms, and phenylene, and $n$ is an integer having a value of 1–2.

7. A copolyester according to claim 6 wherein said monomer is a lactone having up to six carbon atoms in the annular ring.

8. An insoluble resin of poly(alpha-methylene-beta-propionate) crosslinked with a difunctional reagent selected from the group consisting of glycols, diamines, dimercaptans, polyvinyl alcohol, polyether glycol and polyester glycol.

References Cited by the Examiner

UNITED STATES PATENTS 2,806,834   9/1957   Nischk et al. _____ 260—860
3,066,165   11/1962  Rosenthal et al. _____ 260—484

OTHER REFERENCES

Die Makromolekulare Chemie BD. 38–41, Polymerization of Diketene by Furukawa et al., pp. 243–245, July 7, 1960.

MURRAY TILLMAN, *Primary Examiner.*

DONALD E. CZAJA, *Examiner.*

J. A. KOLASCH, J. T. GOOLKASIAN, M. FOELAK, *Assistant Examiners.*